(12) United States Patent
Fujimoto et al.

(10) Patent No.: US 11,434,964 B2
(45) Date of Patent: Sep. 6, 2022

(54) BRAKE LINING FOR A RAILWAY VEHICLE AND DISK BRAKE EQUIPPED WITH THE SAME

(71) Applicants: NIPPON STEEL & SUMITOMO METAL CORPORATION, Tokyo (JP); FINE SINTER CO., LTD., Aichi (JP)

(72) Inventors: Takahiro Fujimoto, Tokyo (JP); Atsushi Sakaguchi, Tokyo (JP); Kazutaka Asabe, Tokyo (JP); Kazumichi Kawasaki, Kasugai (JP); Takeshi Nakano, Kasugai (JP); Tokitake Okahira, Kasugai (JP); Yasushi Karino, Kokubunji (JP); Hajime Takami, Kokubunji (JP)

(73) Assignees: NIPPON STEEL CORPORATION, Tokyo (JP); FINE SINTER CO., LTD., Aichi (JP)

( * ) Notice: Subject to any disclaimer, the term of this patent is extended or adjusted under 35 U.S.C. 154(b) by 350 days.

(21) Appl. No.: 16/064,478

(22) PCT Filed: Dec. 21, 2016

(86) PCT No.: PCT/JP2016/088093
§ 371 (c)(1),
(2) Date: Jun. 21, 2018

(87) PCT Pub. No.: WO2017/115700
PCT Pub. Date: Jul. 6, 2017

(65) Prior Publication Data
US 2019/0024735 A1    Jan. 24, 2019

(30) Foreign Application Priority Data
Dec. 28, 2015  (JP) .............................. JP2015-256680

(51) Int. Cl.
*F16D 65/097* (2006.01)
*B61H 5/00* (2006.01)
(Continued)

(52) U.S. Cl.
CPC ........... *F16D 65/0972* (2013.01); *B61H 5/00* (2013.01); *F16D 55/02* (2013.01);
(Continued)

(58) Field of Classification Search
CPC .... F16D 65/0972; F16D 65/092; F16D 55/02; F16D 69/04; F16D 2200/0021;
(Continued)

(56) References Cited

U.S. PATENT DOCUMENTS 3,297,117 A * 1/1967 Freholm ............... F16D 65/092
188/234
7,648,007 B2 * 1/2010 Russo ................. F16D 65/0006
188/250 E (Continued)

FOREIGN PATENT DOCUMENTS

JP  2002-340056  11/2002
JP  2009-008270   1/2009

(Continued)

*Primary Examiner* — Vishal R Sahni
(74) *Attorney, Agent, or Firm* — Clark & Brody LP

(57) ABSTRACT

This brake lining includes: a plurality of friction members which are arranged to be spaced from each other, each of the friction members having a front surface that is to face a sliding surface of a brake disk; a back board fastened to a back surface of each of the friction members; a base plate that supports each of the friction members at a region including a center portion of each friction member; and an elastic member disposed between the base plate and the back board, on a back surface side of each friction member. Two friction members that are adjacent to each other are taken as a pair, and the back board is fastened to each of the pairs of (Continued)

friction members. In each pair of friction members, the two friction members are arranged along the circumferential direction of the brake disk.

4 Claims, 4 Drawing Sheets

(51) Int. Cl.
*F16D 65/092* (2006.01)
*F16D 65/00* (2006.01)
*F16D 69/04* (2006.01)
*F16D 55/02* (2006.01)

(52) U.S. Cl.
CPC ..... *F16D 65/0006* (2013.01); *F16D 65/0018* (2013.01); *F16D 65/092* (2013.01); *F16D 69/04* (2013.01); *F16D 69/0408* (2013.01); *F16D 2069/0433* (2013.01); *F16D 2200/0021* (2013.01); *F16D 2200/0026* (2013.01); *F16D 2200/0034* (2013.01)

(58) Field of Classification Search
CPC ..... F16D 2069/0433; F16D 2200/0026; F16D 2200/0034; B61H 5/00
See application file for complete search history.

(56) References Cited

U.S. PATENT DOCUMENTS

| 8,544,617 | B2 * | 10/2013 | De Soccio | F16D 69/0408 |
| | | | | 188/235 |
| 10,030,725 | B2 * | 7/2018 | Kato | F16D 65/092 |
| 2014/0097049 | A1 * | 4/2014 | Kato | B61H 5/00 |
| | | | | 188/73.1 |

FOREIGN PATENT DOCUMENTS

| JP | 2009-041583 | 2/2009 |
| JP | 2011-214629 | 10/2011 |
| JP | 2012-251597 | 12/2012 |
| WO | 2011/111822 | 9/2011 |

* cited by examiner

BRAKE LINING FOR A RAILWAY VEHICLE AND DISK BRAKE EQUIPPED WITH THE SAME

TECHNICAL FIELD

The present invention relates to a disk brake for use as a braking device for a railway vehicle. In particular, the present invention relates to a brake lining configured to be pressed against a sliding surface of a brake disk fastened to a wheel or an axle, and to a disk brake for a railway vehicle that is equipped with the brake lining.

BACKGROUND ART

In recent years, the use of disk brakes as braking devices for land transportation vehicles such as railway vehicles, automobiles and motorcycles is increasing as such vehicles become faster and larger. A disk brake is a device that produces a braking force by means of friction generated by sliding contact between a brake disk and a brake lining.

As a disk brake for a railway vehicle, a donut-shaped brake disk is mounted and fastened to a wheel or an axle, and a brake caliper presses a brake lining against a sliding surface of the brake disk, and thereby, a braking force is produced. In this manner, the rotation of the wheel or the axle is controlled, so that the running vehicle slows down.

In the case of a disk brake, a noise that is called "brake squeal" occurs during operation of the disk brake. It is considered that brake squeal occurs because the whole brake unit generates an unstable vibration called a "self-excited vibration". Such a vibration arises due to friction when the brake lining is pressed against the brake disk for braking. The self-excited vibration is a vibration with an increasing amplitude that is generated as a result of external steady energy turning into vibration energy inside the system, and the vibration energy vibrating the system itself. In order to suppress brake squeal, it is necessary to suppress the self-excited vibration caused by the friction during the braking motion.

Patent Literature 1 discloses a disk brake wherein a pad is pressed against a brake disk via a piston. In the disk brake, the pad is moved toward a trailing side (contact ending side) that is the downstream side in the rotational direction of the brake disk by frictional resistance when the pad is pressed against the brake disk. Accordingly, the contact area of the piston with the pad is greater on the trailing side than on the leading side that is the upstream side with respect to the rotational direction of the brake disk. Patent Literature 1 states that by means of this structure, self-excited vibration is suppressed and thus brake squeal can be suppressed.

Patent Literature 2 discloses a brake lining including a base plate and a plurality of friction members. Each of the friction members is fastened to the base plate via an elastic member. The support stiffness of the elastic member is configured to vary depending on the position of the friction member on the base plate. Patent Literature 2 states that this structure can suppress brake squeal.

Patent Literature 3 discloses a brake lining including a base plate and a plurality of friction members. FIG. 1 is a plan view showing the structure of the brake lining disclosed in Patent Literature 3. Each friction member 3 is fastened to a base plate 6 via an elastic member. Two adjacent friction members 3 are connected by a plate-like member 4.

CITATION LIST

Patent Literature

Patent Literature 1: Japanese Patent Application Publication No. 2002-340056
Patent Literature 2: Japanese Patent Application Publication No. 2011-214629
Patent Literature 3: Japanese Patent Application Publication No. 2012-251597

SUMMARY OF INVENTION

Technical Problem

When the technique disclosed in Patent Literature 1 is to be applied to an existing vehicle, it is necessary to change not only the brake lining but also the brake caliper configured to apply a pressing force on the brake lining, and this affects the design of the whole disk brake. Therefore, it is extremely difficult to apply the technique to an existing vehicle.

In the structure of the brake lining disclosed in Patent Literature 2, the support stiffness of each of the elastic members needs to be adjusted in accordance with the position thereof on the base plate, and therefore the manufacture management is complicated.

In the brake lining disclosed in Patent Literature 3, the reason that two friction members are connected together by a plate-like member is for the purpose of suppressing rotation of the respective friction members and suppressing variations in frictional coefficient between the individual friction members. Patent Literature 3 does not discuss suppression of brake squeal.

In view of the situation described above, an objective of the present invention is to provide a brake lining and a disk brake that can suppress brake squeal easily.

Solution to Problem

A brake lining of the present embodiment is a brake lining configured to be pressed against a sliding surface of a brake disk fastened to a wheel or an axle of a railway vehicle, the brake lining including:
a plurality of friction members arranged to be spaced from each other, each of the friction members having a front surface that is to face the sliding surface of the brake disk;
a back board fastened to a back surface of each of the friction members;
a base plate supporting each of the friction members at a region including a center portion of each of the friction members; and
an elastic member disposed between the base plate and the back board, on a back surface side of each of the friction members;
wherein:
two of the friction members that are adjacent to each other are taken as a pair, and the back board that is fastened to the pair of friction members is a one-piece member; and
in each pair of the friction members, two of the friction members are arranged along a circumferential direction of the brake disk.

A disk brake according to the present embodiment is a disk brake including:
a brake disk fastened to a wheel or an axle of a railway vehicle; and the aforementioned brake lining to be pressed against a sliding surface of the brake disk.

Advantageous Effects of Invention

The brake lining and disk brake of the present invention can suppress brake squeal. Also, it is easy to apply the brake lining of the present invention to an existing vehicle, and the manufacture management of the brake lining is simple.

DESCRIPTION OF EMBODIMENTS

Figure 1:
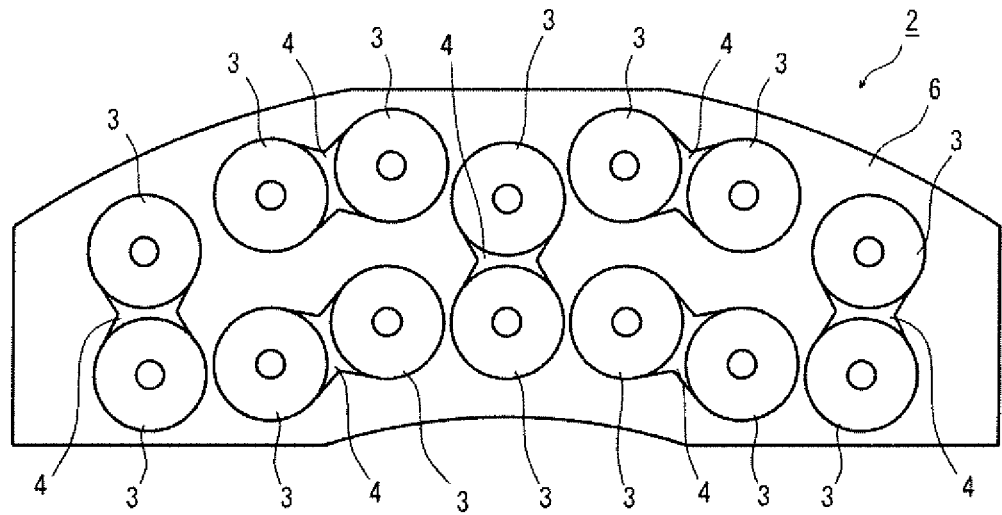
FIG. 1 is a plan view of a conventional brake lining.

The present inventors discovered that in the conventional brake lining shown in FIG. 1, the amplitude of an unstable vibration mode of the friction members 3 differs depending on the arrangement direction of the two friction members 3 in a pair of the friction members 3.

Figure 2:
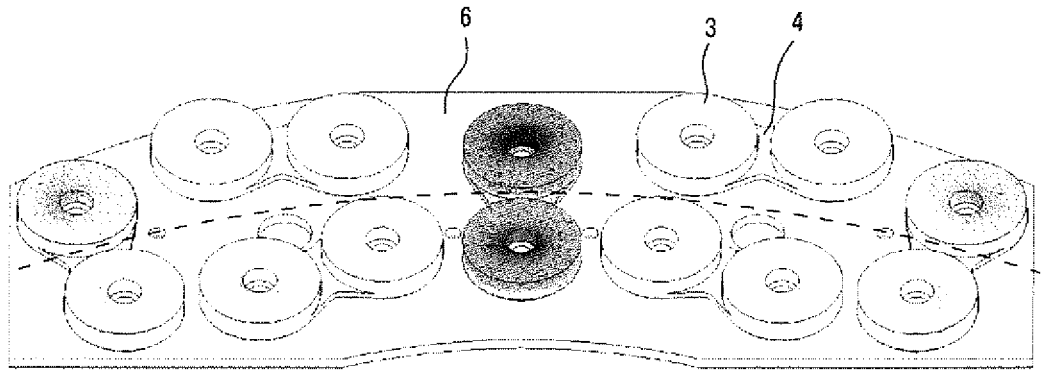
FIG. 2 is a perspective view illustrating the distribution of amplitudes that arise during a braking motion of a conventional brake lining.

FIG. 2 is a perspective view illustrating the distribution of amplitudes that arises during a braking motion of the conventional brake lining. This amplitude distribution was determined by FEM (finite element method) analysis. In FIG. 2, the closer to black (the darker the color) that a portion is, the greater that the amplitude of an unstable vibration mode is at the relevant portion.

Based on FIG. 2, it is found that the amplitude of an unstable vibration mode is small when the arrangement direction of two friction members 3 is along the circumferential direction (indicated by a broken line in FIG. 2) of the brake disk, and is large when the arrangement direction is along the radial direction of the brake disk. Of the unstable vibration modes of the vibrations of the friction members 3, such kind of vibration is the principal cause of brake squeal. In this brake lining, one pair of friction members 3 is disposed at a middle portion (on a center line that bisects the brake lining in the longitudinal direction thereof) in the direction along the circumferential direction of the brake disk, and generation of excessive vibration is concentrated at this pair of friction members.

The brake lining and disk brake for a railway vehicle of the present invention were completed based on the above finding. As described above, the brake lining of the present invention includes: a plurality of friction members arranged to be spaced from each other, each of the friction members having a front surface that is to face the sliding surface of the brake disk; a back board fastened to a back surface of each of the friction members; a base plate supporting each of the friction members at a region including a center portion of the respective friction members; and an elastic member disposed between the base plate and the back board, on a back surface side of each of the friction members. Two of the friction members that are adjacent to each other are taken as a pair, and the back board that is fastened to the pair of friction members is a one-piece member. In each pair of the friction members, the two friction members are arranged along a circumferential direction of the brake disk.

The disk brake of the present invention includes: a brake disk fastened to a wheel or an axle of a railway vehicle; and the aforementioned brake lining that is to be pressed against a sliding surface of the brake disk.

Figure 3A:
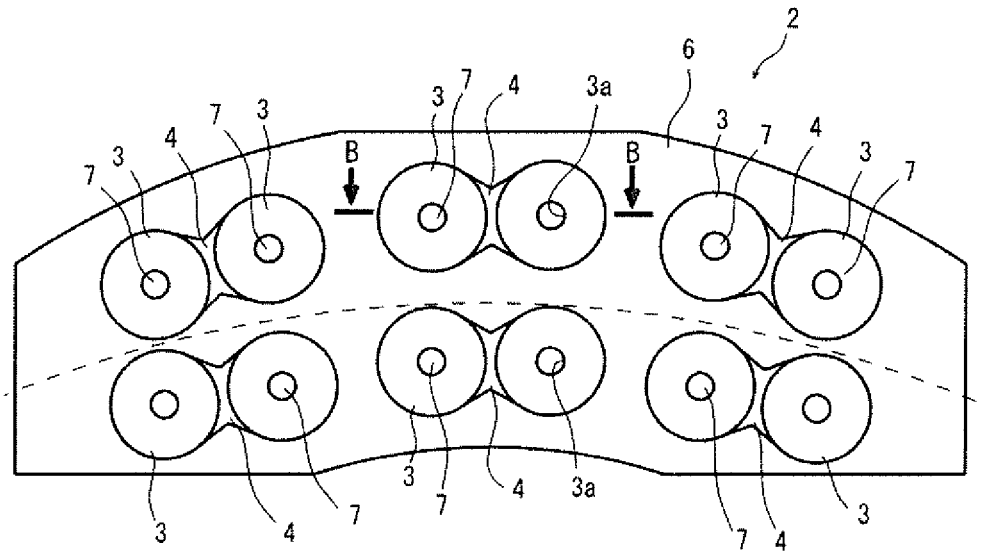
FIG. 3A is a plan view of a brake lining according to one embodiment of the present invention.
Figure 3B:
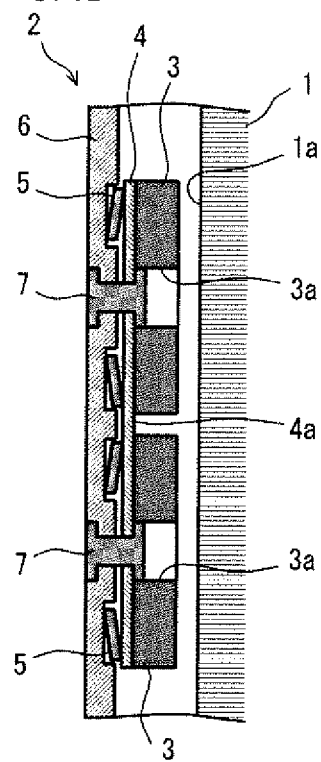
FIG. 3B is a sectional view of the brake lining shown in FIG. 3A along the line B-B.

A disk brake for a railway vehicle according to an embodiment of the present invention will hereinafter be described in detail. FIG. 3A and FIG. 3B are views that illustrate an example of a brake lining that is provided in the disk brake for a railway vehicle according to the present invention. FIG. 3A shows a plan view of the brake lining, and FIG. 3B shows a sectional view of the brake lining shown in FIG. 3A along the line B-B. FIG. 3A shows a state in which the brake lining is seen from its front side that is to face the brake disk.

As shown in FIG. 3B, the disk brake of the present invention includes a brake disk 1 and a brake lining 2. The brake lining 2 is attached to a brake caliper (not shown). The brake disk 1 is a donut-shaped disk in a plan view. The brake disk 1 is attached to a wheel or an axle (not shown) and is securely fastened thereto by a bolt or the like.

For braking, the brake caliper is activated to press the brake lining 2 against a sliding surface 1a of the brake disk 1. This generates sliding friction between the brake disk 1 and the brake lining 2, and thereby generates a braking force. In this way, the disk brake controls the rotation of the wheel or axle and slows the running vehicle.

The brake lining 2 includes a plurality of friction members 3, back boards 4, elastic members 5, and a base plate 6 supporting all of these components. The plurality of friction members 3 are arranged so as to be spaced from each other. A front surface of each of the friction members 3 faces the sliding surface 1a of the brake disk 1.

The friction members 3 are made of a copper sintered material or a resin material or the like. In the embodiment shown in FIG. 3A, the friction members 3 are a circular planar shape, and have substantially the same diameter as each other. A small hole 3a is formed in the center portion of each friction member 3. Rivets 7 are inserted in the small holes 3a. The rivets 7 fix the friction members 3 to the base plate 6. The planar shape of the friction members 3 is not limited to a circular shape, and for example may be a polygonal shape such as a quadrangular shape or a hexagonal shape.

The back boards 4 which are made of a thin plate of a metal such as steel are fastened to the back surface of each friction member 3 in order to maintain the strength and stiffness of the friction members 3. Two of the friction members 3 that are adjacent to each other are taken as a pair, and one back board 4 is provided for each pair of the friction members 3. The back board 4 is a one-piece member extending over both of the friction members 3 that constitute the pair of friction members 3. The pair of friction members 3 are in a state in which they are connected together by the back board 4. The number of pairs of the friction members 3 is not particularly limited. Since each pair of the friction members 3 is composed of two friction members 3, the total number of friction members 3 is an even number.

In this embodiment, each back board 4 has circular disk portions which are approximately the same size and shape as each of the pair of friction members 3 in a plan view, and a connection portion that connects the two circular disk portions (see FIG. 3A). The width (dimension in a direction perpendicular to the length direction of the back board 4) of the connection portion is less than the width of each circular disk portion. Accordingly, the back board 4 as a whole has a shape that is narrow in the middle in the length direction.

In each of the pairs of friction members 3, the two friction members 3 are arranged along the circumferential direction (indicated by a broken line in FIG. 3A) of the brake disk. There are no pairs of friction members 3 arranged along the radial direction of the brake disk 1.

The arrangement direction of two of the friction members 3 forming a pair need not strictly match the circumferential direction of the brake disk 1, and an inclination of a certain amount from the circumferential direction is allowed. In the present invention the phrase "friction members 3 are arranged along the circumferential direction of the brake disk" means that an inclination angle θ defined hereunder is not more than 45°.

Figure 4A:
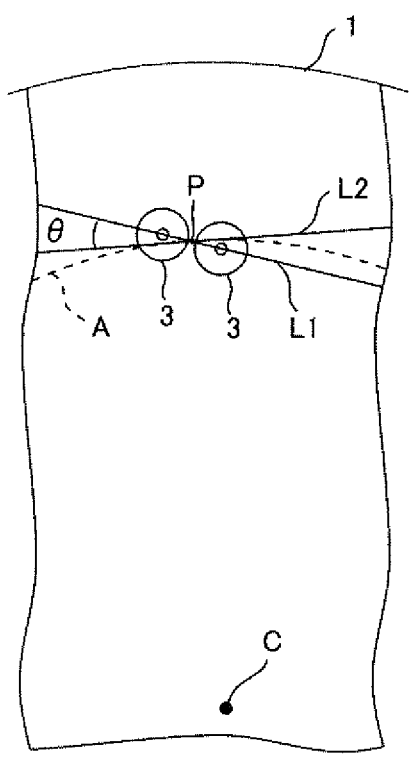
FIG. 4A is a plan view for describing an inclination angle of one pair of friction members.

FIG. 4A is a plan view for describing an inclination angle of a pair of friction members. In the pair of friction members 3, a straight line that passes through the center of each of the friction members 3 is denoted by reference character L1, and a middle point of the centers of the two friction members 3 is denoted by reference character P. The straight line L1 corresponds to the arrangement direction of the friction members 3. A circle that centers on a center C of the brake disk 1 and passes through the middle point P is denoted by reference character A. A tangential line of the circle A at the middle point P is denoted by reference character L2. The tangential line L2 corresponds to the circumferential direction of the brake disk 1 at the middle point P. An angle θ which the straight line L1 and the tangential line L2 form is taken as the inclination angle. However, the inclination angle θ when L1 and L2 match is taken as 0°. In a case where the planar shape of the friction members 3 is not circular, in the above definition the term "center of gravity" is substituted for "center".

Each friction member 3 is fastened to the base plate 6, as well as the back board 4, by the rivet 7 that is inserted through the small hole 3a in the center portion of the individual friction members 3. That is, each friction member 3 is supported by the base plate 6 by means of the rivet 7 at a region that includes the center portion of the respective friction members 3. On a back surface side of each friction member 3, the elastic member 5 is disposed between the back board 4 and the base plate 6. By this means, the plurality of friction members 3 are in a state in which each friction member 3 is elastically supported individually. Note that although disk springs are shown as an example of the elastic members 5 in FIG. 3B, plate springs or coil springs may also be used as the elastic members 5.

The back boards 4 are deformable when an external force is applied thereto. Therefore, the respective friction members 3 are individually movable during braking motion. By this means, the contact surface pressure between the brake lining 2 and the brake disk 1 during braking motion can be uniformized.

Further, because each pair of friction members 3 is in a state in which the pair of friction members 3 are connected together by a one-piece back board 4, the movements thereof are constrained in comparison to a case where the friction members 3 are not connected together by a back board. Therefore, the frictional coefficient between the brake disk 1 and the brake lining 2 can be stabilized regardless of the running speed of the vehicle at the start of braking motion.

Furthermore, since each pair of friction members 3 is fastened to the base plate 6 by two rivets 7, a pair of friction members 3 does not rotate around the center of the pair of friction members 3 during braking motion, and thus looseness can be prevented from arising at portions at which the friction members 3 are fastened to the base plate 6. Even if the looseness arises at the fastening portions, the friction members 3 will not immediately fall off unless the fastening portions at the two locations are damaged at the same time. Therefore, sufficient durability and sufficient reliability of the disk brake can be ensured.

Further, since each of the friction members 3 is elastically supported with the position of the rivet 7 that is directly below the center portion thereof acting as a support point, the friction members 3 do not incline significantly even if the friction members 3 contact with the brake disk 1 and move during braking motion, and the entire contact surface of each friction member 3 becomes worn uniformly over the whole area thereof, and partial wearing of the friction members 3 does not occur.

As described above, in each pair of the friction members 3, the arrangement direction of the two friction members 3 and the arrangement direction of the two rivets 7 (fastening members) are along the circumferential direction of the brake disk 1, and there are no pairs of friction members 3 arranged along the radial direction of the brake disk 1. Therefore, with respect to each friction member 3, when the friction member 3 vibrates during braking motion, the amplitude of the unstable vibration mode is small. Therefore, brake squeal can be suppressed. To achieve this effect, the inclination angle θ is preferably not more than 25°, and more preferably is not more than 15°.

In general, brake squeal can be progressively suppressed as the inclination angle θ approaches 0°. However, in specific cases, making the inclination angle θ an angle of a specific size that is not 0° can suppress brake squeal. Such a case is described hereunder.

Figure 4B:
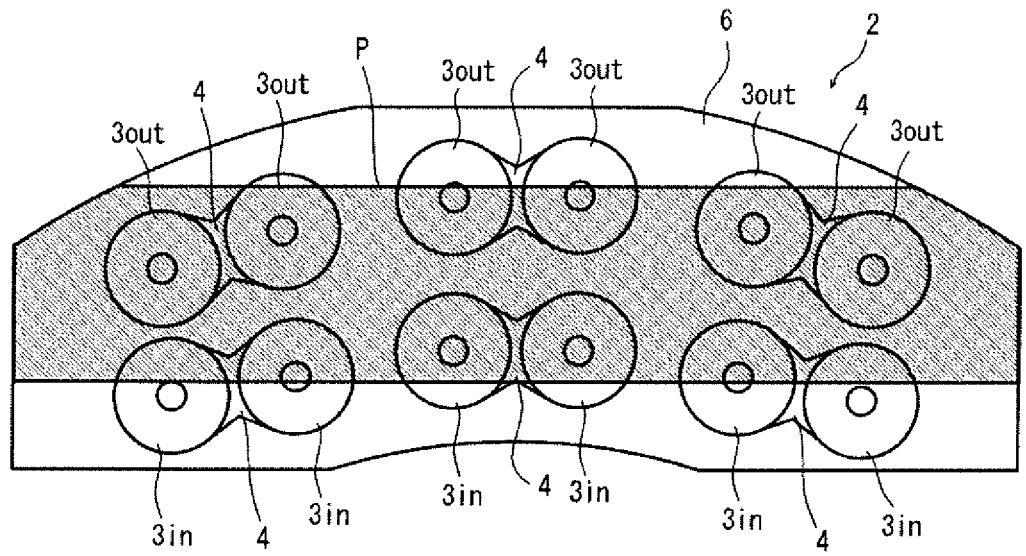
FIG. 4B is a plan view illustrating a range over which a pressing pressure is applied in the brake lining.

FIG. 4B is a plan view showing the range in which a pressing pressure is applied in the brake lining. A pressing pressure is applied by the brake caliper to the back surface (face on opposite side to the face on which the friction members 3 are provided) of the base plate 6. The hatched portion in FIG. 4B is one example of a region (hereunder, referred to as "pressing region") P at which a pressing pressure is applied. In the brake lining 2, the friction members are approximately arranged along two concentric circles. Three pairs (6) friction members 3out are arranged along the outer circle, and three pairs of friction members 3in are arranged along the inner circle.

Each of the friction members 3 (friction members 3out and friction members 3in) has a portion that does not enter the pressing region P. Among the friction members 3out on the outer side, in the respective pairs of friction members 3out disposed on both end sides in the length direction of the base plate 6, a portion that does not enter the pressing region P is very small. Further, among the friction members 3in on the inner side, with respect to the pair of friction members 3in disposed at the center in the length direction of the base plate 6, although a portion thereof that does not enter the pressing region P is greater than the aforementioned pairs of friction members 3out, a major portion thereof enters the pressing region P.

On the other hand, apart from the friction members 3 mentioned above, a portion of the respective friction members 3 that does not enter the pressing region P is large. Among the friction members 3in on the inner side, a portion that does not enter the pressing region P is the largest in the two pairs of friction members 3in disposed on both end sides in the length direction of the base plate 6. In the friction members 3, a portion that does not enter the pressing region P vibrates more easily than a portion that enters the pressing region P. Such a vibration can become a cause of brake squeal.

Figure 4C:
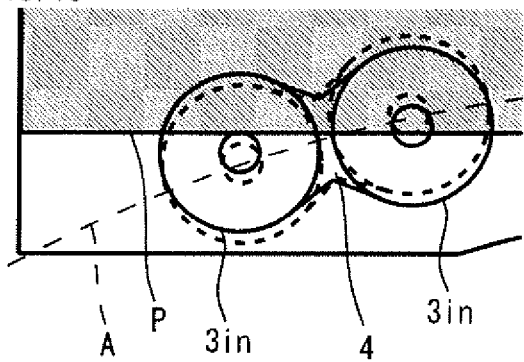
FIG. 4C is a plan view for describing an inclination angle of one pair of friction members that are disposed in the vicinity of an end portion of the brake lining.

FIG. 4C is a plan view for describing an inclination angle of a pair of friction members disposed at an inside end portion in the brake lining. In a case where the inclination angle θ when this pair of friction members 3in is pivoted around a middle point at the center of the two friction members 3in is made 0°, the pair of friction members 3in are positioned as indicated by a broken line in FIG. 4C. In this case, among this pair of friction members 3in, a major portion, specifically, approximately 70% of the area, of the friction member 3in on the end portion side in the length direction of the base plate 6 does not enter the pressing region P. Therefore, this friction member 3in is liable to vibrate, and can increase brake squeal.

In the embodiment shown in FIG. 4C, the pair of friction members 3in at the end portion on the inner side are inclined at an inclination angle θ so that an angle formed between the direction in which these friction members 3in face and an edge of the pressing region P that traverses these friction members 3in is small. The inclination angle θ is in the range of 10 to 20°, and for example is 15°. By means of this configuration, with respect to each friction member 3in among this pair of friction members 3in, the proportion of a portion that does not enter the pressing region P is not more than 60% in terms of area. Therefore, in comparison to the case where the inclination angle θ is 0°, vibrations are suppressed overall, and brake squeal can be reduced.

Referring to FIG. 3A, on the base plate 6, a friction member 3 is not disposed at the middle portion along the circumferential direction of the brake disk 1. By this means also, the amplitude of an unstable vibration mode of the friction members 3 is lessened and brake squeal is suppressed.

In a case of applying this brake lining configuration to an existing vehicle, for example, it suffices to only change the arrangement direction of the friction members so as to be the appropriate direction, and it is not necessary to change a brake caliper and the like. Further, in this brake lining, there is no necessity to change the support stiffness of the elastic members 5 depending on the positions thereof on the base plate 6. Accordingly, it is easy to apply the brake lining 2 to an existing vehicle, and the manufacture management of the brake lining 2 is simple.

EXAMPLES

In order to confirm the effects of the present invention, a squeal index was evaluated for each of three kinds of brake lining (brake lining of an inventive example, brake lining of comparative example 1, and brake lining of comparative example 2). The squeal indices were calculated from the results of a FEM (finite element method) analysis. Specifically, first, damping ratios of oscillations at various frequencies were calculated from FEM complex eigenvalue analysis. The negative values, that is, unstable oscillations among the results in each frequency range with a ⅓ octave band were summed up, and the absolute value of the sum was obtained for the frequency range. The maximum value of the values for the frequency ranges was extracted and set as a squeal index value. A smaller value of the squeal index indicates that it is more difficult for brake squeal to occur, and even when brake squeal occurs, the sound thereof is small.

Figure 5A:
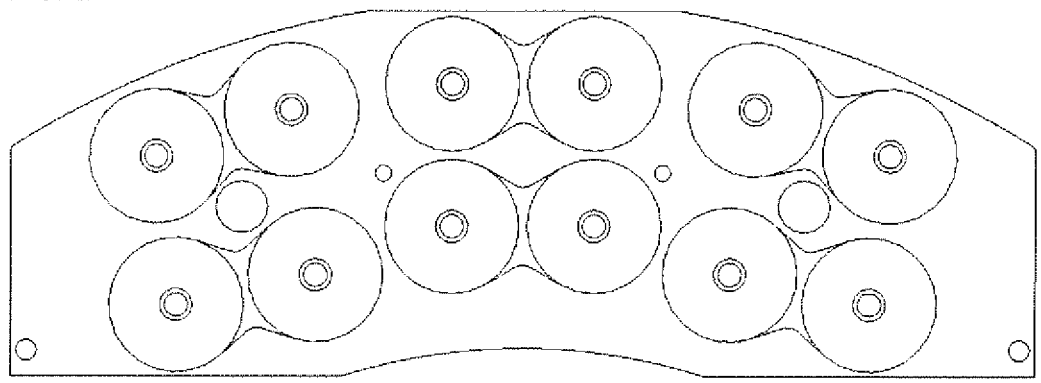
FIG. 5A is a plan view of a brake lining provided in a disk brake of an inventive example.
Figure 5B:
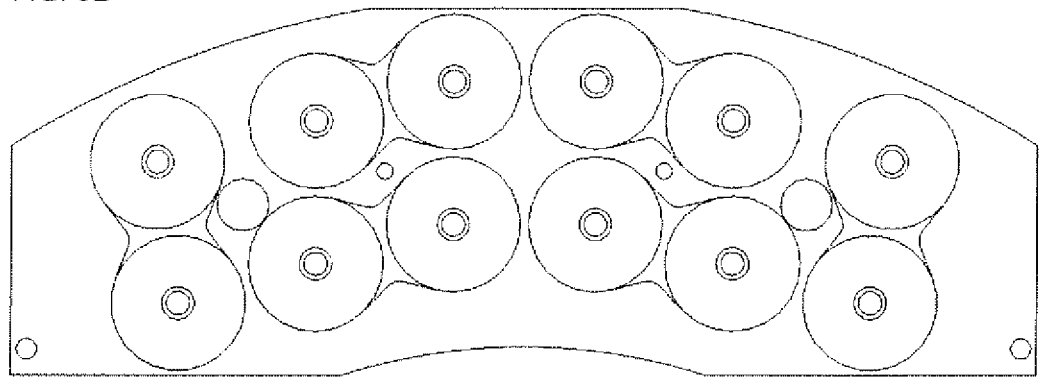
FIG. 5B is a plan view of a brake lining provided in a disk brake of comparative example 1.
Figure 5C:
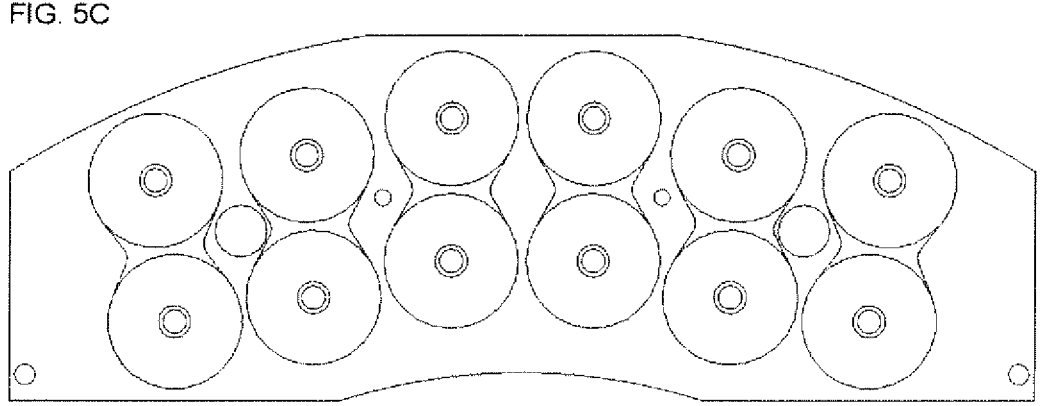
FIG. 5C is a plan view of a brake lining provided in a disk brake of comparative example 2.

FIG. 5A to FIG. 5C are plan views of the respective brake linings that were the objects of analysis. Each of the brake linings included six pairs of friction members (12 friction members).

FIG. 5A is a plan view of a brake lining provided in a disk brake of the inventive example. In this brake lining, all of the pairs of friction members are arranged along the circumferential direction of the brake disk.

FIG. 5B is a plan view of a brake lining provided in a disk brake of comparative example 1. This brake lining includes four pairs of friction members arranged along the circumferential direction of the brake disk, and two pairs of friction members arranged along the radial direction of the brake disk.

FIG. 5C is a plan view of a brake lining provided in a disk brake of comparative example 2. In this brake lining, all of the pairs of friction members are arranged along the radial direction of the brake disk.

Figure 6:
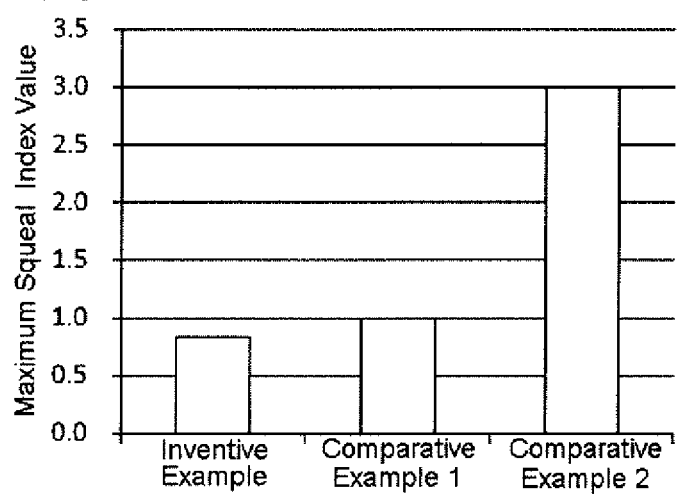
FIG. 6 is a diagram showing a comparison of maximum squeal index values with respect to brake linings provided in disk brakes of the inventive example, comparative example 1 and comparative example 2, respectively.

FIG. 6 shows a comparison of the maximum squeal indices of these brake linings. FIG. 6 shows relative values when the value of the squeal index of comparative example 1 is taken as a reference value of 1. As shown in FIG. 6, in the inventive example the size of the maximum squeal index value is reduced by approximately 20% relative to comparative example 1, while the size of the maximum squeal index value for comparative example 2 is approximately three times greater than the size of the maximum squeal index value for comparative example 1.

The size of the maximum squeal index value has a correlation with the number of pairs of friction members arranged along the radial direction (not arranged along the circumferential direction) of the brake disk, and the greater the number of such pairs of friction members is, the larger the maximum squeal index value becomes. That is, it was confirmed that brake squeal can be reduced by eliminating pairs of friction members that are not arranged along the circumferential direction of the brake disk.

INDUSTRIAL APPLICABILITY

The disk brake for a railway vehicle of the present invention can be effectively utilized in various railway vehicles, and in particular is effectively utilized in high-speed railway vehicles which can run at various speeds in a wide range from low speed to high speed.

REFERENCE SIGNS LIST

1: brake disk
1a: sliding surface
2: brake lining
3: friction member
4: back board
5: elastic member
6: base plate
7: rivet

The invention claimed is:

1. A brake lining configured to be pressed against a sliding surface of a brake disk fastened to a wheel or an axle of a railway vehicle, the brake lining comprising:
a plurality of friction members arranged to be spaced from each other, each of the friction members having a front surface that is to face the sliding surface of the brake disk;
a back board fastened to a back surface of each of the friction members;
a base plate supporting each of the friction members at a region including a center portion of each of the friction members; and
an elastic member disposed between the base plate and the back board, on a back surface side of each of the friction members;
wherein:
two of the plurality of friction members that are adjacent to each other are taken as at least one pair, and the back board that is fastened to the at least one pair of friction members is a one-piece member;
in each of the at least one pair of friction members, the two friction members are arranged along a circumferential direction of the brake disk; and
each friction member is fastened to the base plate by a fastening member, and a direction of a line extending between two of the fastening members in the at least one pair of friction members extends along the circumferential direction of the brake disk,
wherein in a plan view of the base plate, none of the friction members are disposed on a radial line extending in a radial direction of the brake disk, the radial line extending throughout the base plate and positioned at a middle portion of the base plate with respect to a direction along the circumferential direction of the brake disk; and further wherein, in a plan view,
an edge of a pressing region intersects at least one of the friction members, the pressing region being a region of the base plate on which a pressing pressure is applied by a brake caliper, and
one pair of the friction members including the friction member intersected by the edge are inclined at an inclination angle so that a proportion of a portion of the pair of the friction members that does not enter the pressing region is decreased in terms of area in comparison with the proportion where the inclination angle is zero, the inclination angle being an angle between a straight line that passes through a center of each of the one pair of friction members and a tangential line of a circle that centers on a center of the brake disk and passes through a middle point of the centers of the one pair of friction members, the tangential line passing through the middle point.

2. A disk brake, comprising:
a brake disk fastened to a wheel or an axle of a railway vehicle; and
the brake lining according to claim 1 to be pressed against a sliding surface of the brake disk.

3. The brake lining according to claim 1, wherein, in a plan view of the base plate, the back board is disposed on the radial line.

4. The brake lining according to claim 1, wherein the back board includes a plurality of back boards, and at least one of the back boards is disposed on the radial line.

* * * * *